United States Patent Office 3,427,160
Patented Feb. 11, 1969

3,427,160
CAPSULAR PRODUCTS
William J. McCune, Jr., South Lincoln, Mass., assignor to Polaroid Corporation, Cambridge, Mass., a corporation of Delaware
Continuation-in-part of application Ser. No. 108,774, May 9, 1961. This application Apr. 26, 1966, Ser. No. 545,509
U.S. Cl. 96—29       11 Claims
Int. Cl. G03c 7/30

ABSTRACT OF THE DISCLOSURE

This application is in part a continuation of my co-pending U.S. application Ser. No. 108,774, filed May 9, 1961, now U.S. Patent 3,276,869, issued Oct. 4, 1966.

---

This invention relates to capsules adapted to retain solid and fluid materials and to the use of such capsules in photographic color processes for forming monochromatic and multichromatic images and to photographic products for carrying out said processes, wherein the capsules include a substantially continuous film-forming polymeric layer surrounding a nucleus comprising color-providing material, for example, dye developer, having a substantially continuous metallic layer thereover, for example, a substantially continuous layer comprising an elemental metal.

A principal object of the present invention is to provide improved capsules, that is, improved capsules of the construction comprising a nucleus of a solid or fluid material contained or encapsulated within a shell-like coating of a film-forming polymeric material, the outermost surface or wall of the capsules being coated with a suitable material to predeterminedly modify said wall.

Another object of the invention is to provide minute capsules of the aforementioned construction which possess substantially high impermeability or imperviousness to prevent loss of encapsulated fluid material or to occlude environmental substances such as water vapor or oxygen or the like from contact with encapsulated material which may be sensitive or reactive therewith.

Still another object of the present invention is to provide color images by a process wherein the effective emulsion speed of the photosensitive element employed is substantially increased by utilizing minute capsules of the aforementioned construction.

Another object of the invention is to provide novel products and processes utilizing minute capsules of the aformentioned construction for forming color images by transfer techniques wherein an imagewise distribution of one or more color-providing substances is formed in unexposed parts of a negative photosensitive element having one or more light-sensitive portions having silver halide therein and transferred to an image-receiving element, and wherein the imagewise distribution of each color-providing substance so transferred by imbibition and deposited upon the image-receiving element arranged in superposed relation to the negative photosensitive element colors the image-receiving element a predetermined color to provide therein a monochromatic or multichromatic image comprising one or more positive images of negative latent color images formed by the exposure of said photosensitive element.

Still another object of the invention is the provision of a photosensitive element, usable in a color process which comprises a support, one or more light-sensitive portions comprising a silver halide emulsion, capsules containing at least a predetermined color-providing substance, such as, for example, a dye which is capable of coupling with an oxidized silver halide developer or a dye which is itself a silver halide developer, associated with each light-sensitive portion, the color-providing substance employed adapted to be transferred at least in part to an image-receiving element for coloring said image-receiving element, said capsules having a light reflecting coating for increasing the effective emulsion speed of the photosensitive element.

A further object of the invention resides in the provision of a photographic product in the nature of a film unit especially adapted for use in a transfer process and comprising a photosensitive element or negative material of the character described above, a positive image-receiving element adapted to be associated with said negative photosensitive element in superposed relation thereto, and a container holding a liquid processing composition for processing said film unit after exposure thereof.

A further object of the present invention is to provide novel photographic processes and products for obtaining color images by diffusion-transfer processes, wherein color-providing substances such as dye developers utilized to provide said colored images are encapsulated within minute capsules of alkali-permeable polymeric material, said capsules being coated with silver halide.

Still another object of the present invention is to provide novel photosensitive elements comprising at least one layer containing minute capsules of alkali-permeable polymeric material, said capsules containing therewithin a color-providing substance and being coated with silver halide.

Still another object of the present invention is to provide novel minute capsules of alkali-permeable polymeric material containing therewithin a color-providing substance, said capsules being coated with silver halide.

Other objects of the invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure and the scope of the application of which will be indicated in the claims.

For a fuller understanding of the nature and objects of the invention, reference should be had to the following detailed description taken in connection with the drawings wherein.

The formation in a variety of sizes and shapes of capsules consisting of a nucleus comprising, for example, a liquid around which is deposited a dense shell-like coating of a film-forming organic polymeric material is well known to the art. A great number of materials in solid or liquid form may be encapsulated. For example, materials such as mineral and vegetable oils, kerosene, gasoline, turpentine, carbon tetrachloride, chloroform, flavors, perfumes, catalysts, propellants, oxidizers, medicines, e.g., vitamins, color-providing substances or materials, e.g., dye developers, adhesives, magnetic materials and a host of others have been encapsulated. Release of the encapsulated material at the required time may be accomplished in any one of several ways such as, for example, rupturing or breaking, melting, dissolving, etc. the capsule wall.

The applications or uses for such encapsulated materials are obviously numerous. For example, in U.S. Patents 2,712,507, 2,730,456 and 2,730,457 there is disclosed, for use in manifold record materials, microscopic pressure-rupturable capsules comprising film-forming hydrophilic colloid material deposited around a central nucleus of an oily water-immiscible printing fluid. In U.S. Patent 2,932,582 there is disclosed a transfer record sheet having a coating of microscopic, pressure-rupturable capsules containing a liquid solvent or vehicle for a coloring material carried by said sheet in solid form. In U.S. Patent 2,907,682 there is disclosed adhesive tapes which employ microscopic pressure-rupturable capsules containing solid soluble adhesive and microscopic pressure-rupturable capsules containing a liquid solvent for the solid adhesive used. The use of encapsulated dyes has also been proposed for various photographic systems. Pressure-rupturable capsules containing particles of magnetic material, e.g., magnetic iron oxide, have been disclosed for printing purposes. Other uses are as means for storing and handling hazardous, reactive, toxic or noxious materials, etc.

In a great many uses, a capsule wall of high impermeability is desired in order, for example, to prevent loss of encapsulated fluid material or to exclude environmental substances such as moisture, oxygen or the like from contact with the encapsulated material. In the present invention there are provided capsules having the outer surfaces or walls thereof coated with a thin continuous film or layer of a metal such as, for example, aluminum or other material, for example, polymeric fluorocarbons which increase the impermeability of the capsule wall without at the same time (a) appreciably increasing the wall thickness or capsule size, (b) appreciably modifying the rupture or release characteristics of the capsule wall, and (c) undesirably modifying the wall-to-fill ratio. The thin continuous coating may be applied by any one of several methods such as, for example, spraying, electroplating, vapor deposition and the like.

The minute capsules of the present invention may be formed of film-forming polymeric material of a hydrophilic nature or character such as, for example, gelatin; or they may be formed of film-forming polymeric material of a hydrophobic nature such as, for example, polyvinyl chloride. Each capsule consists of a nucleus comprising, for example, a solid or substantially solid material, e.g., magnetic iron oxide or a fluid material, e.g., a color-providing substance in solution or dispersed in a suitable medium around which has been deposited a dense shell-like coating of film-forming polymeric material which may be pressure-rupturable.

The encapsulated material which encloses or surrounds the nucleus may comprise one or more hydrophilic film-forming polymeric materials or one or more film-forming hydrophobic polymeric materials. Thus, hydrophilic polymeric materials such as gelatin, gum arabic, methyl cellulose, starch, alginates, polyvinyl alcohol, casein, agar-agar and the like may be utilized as encapsulating materials. It is also possible to employ as the encapsulating material a "complex" of film-forming hydrophilic polymeric materials. By a "complex" of hydrophilic polymeric materials is meant the product resulting from the union in a suitable medium of two kinds of hydrophilic polymeric materials having opposite ionic charges in said medium, the union being brought about by such difference in charge. Hydrophobic polymeric materials such as, for example, polyvinyl chloride, butadiene-styrene containing resins, acrylic resins, urethanes, fluorocarbons, polyethylene, polyvinylidine chloride, regenerated cellulose and the like, may also be employed as the relatively thick or self-supporting shell-like encapsulating wall. The encapsulating material selected in any specific instance depends upon the encapsulating process employed and the particular material to be encased therewithin.

There are many ways in which the capsules of the present invention may be formed and which are well known to the art. Suitable methods are described, for example, in U.S. Patents 2,800,457, 2,800,458, and 2,907,-682. One illustrative method of making minute or microscopic capsules of film-forming hydrophilic polymeric material containing a color-providing substance such as a dye or dye intermediate comprises making an aqueous sol of a hydrophilic polymeric material, e.g., gelatin, and emulsifying therein a water-immiscible organic liquid, in which the color-providing substance is dissolved or stability suspended until the required microscopic drop size is attained, and thereafter diluting the emulsion with water or an acidified aqueous solution in such amount so as to cause the hydrophilic polymeric material to deposit around each microscopic drop of adhesive. All of the foregoing steps are carried out at a temperature above the gelatin or solidification point of the polymeric material. In the case of gelatin, the temperature during these steps is maintained at 50° C. or above. Gelation or solidification of the encapsulating material is then achieved by cooling to a temperature below the gelation or solidification point of the material. If this latter step is performed rapidly, as by rapid cooling, the pore size of the resultant capsules will be small. If the gelation step is performed slowly, the pore structure of the encapsulating material will be coarser. At this point the encapsulation of the color-providing substance with hydrophilic polymeric material is complete.

If it is desirable to make the capsular material, as produced above, hard, more heat resistant and insoluble in water, it can be treated, for example, with a well-known gelatin hardener, e.g., formaldehyde and the like. If desired, after hardening and drying, the agglomerate mass of capsules may be comminuted to form fine granules of any desired size.

An illustrative method of making capsules of two hydrophilic polymeric materials such as gelatin and gum arabic comprises forming two compatible sols by dispersing hydrophilic materials such as gum arabic and gelatin in water, mixing the two aqueous sols together and then emulsifying therein the water-immiscible organic liquid and color-providing substance or emulsifying the organic liquid and color-providing substance in one of the sols first and then mixing the emulsion with the second sol. The pH of the emulsion so formed, if necessary, may be adjusted so that the ions of the two materials, e.g., gum arabic and gelatin have different electric charge. Deposition of a complex of hydrophilic materials around microscopic nuclei or droplets of the water-immiscible organic liquid containing a color-providing substance is achieved by dilution with water and/or changing the pH of the mixture. All of the foregoing steps are carried out at temperatures above the gelation or solidification point of the hydrophilic polymeric material. Gelatin is achieved as previously described, that is, by cooling the complex encapsulating material below its gelation or solidification temperature.

More detailed descriptions of preparing minute capsules by emulsion techniques as illustrated above may be found in a number of patents. For example, U.S. Patents 2,800,457 and 2,800,458 disclose mixtures for making minute oil-containing capsules. The droplet of enclosed oil may have suspended or dissolved therein a dye or dye intermediate. U.S. Patent 2,907,682 discloses methods for encapsulating adhesive materials as well as methods for encapsulating solvents or vehicles for said adhesive materials. U.S. Patent 2,932,582 discloses methods for encapsulating liquid solvents or vehicles for printing or marking materials. U.S. Patent 2,953,454 discloses a method for encapsulating a color-forming material whose electromagnetic absorption characteristics may be reversibly changed by different applied electromagnetic radiations. U.S. Patent 2,971,916 discloses a method for making capsules containing a magnetic material. The encapsulation of other materials has also been disclosed in a number of the above patents.

Another encapsulation method known to the art comprises feeding or extruding a film-forming encapsulating material in viscous liquid form into a nozzle where it forms a membrane over the nozzle's orifice and introducing into such membrane through a tube leading to the orifice a filler material, e.g., color-providing substance. In one embodiment the film-surrounded filler separates into minute capsules by gravitational and surface tension forces. In another embodiment the film-surrounded filler is ejected from the nozzle by centrifugal force. In each case the minute capsules so formed are dropped or flung into a suitable bath to cause hardening or setting of the encapsulating film-forming material. More detailed descriptions of making capsules according to the above techniques may be found, for example, in U.S. Patent 2,275,154, Chemical and Engineering News, July 13, 1959, p. 44, and Design News, June 20, 1960.

The permeability of fluids through the capsule walls may be decreased by providing the outer wall or surface of the capsules with a thin continuous coating of suitable material, preferably a metal such as, for example, aluminum. One process for coating each capsule with a thin continuous film or layer of a metal or metal-bearing compound, e.g., metal oxide, or other material, e.g., Teflon (Trademark of E. I. du Pont for tetrafluoroethylene polymers), involves vacuum deposition. The step of vacuum depositing may involve either thermally evaporating or cathode sputtering at pressures below about 100 microns of mercury and usually within the range of from 0.1 to 100 microns of mercury and depositing the vaporized material as a thin continuous coating upon the outer wall of the capsules. When the vacuum deposition is effected by thermal evaporation, pressures below 10 microns are usually employed. The temperature employed, in any case, is dependent upon the material being evaporated and pressure. When the vacuum deposition is effected by cathode sputtering, voltages of the order of 5 to 10 kilowatts, and pressures of from 10 to 20 microns of mercury are common.

Among the large number of metals or metallic materials capable of being vacuum deposited upon the outermost surfaces of capsules, mention may be made of, for example, aluminum, silver, zinc, magnesium, cadmium, chromium, cobalt, copper, gold, nickel, iron, tin, platinum, palladium and the like. Metal oxides such as aluminum oxide, tin oxide and other metal-containing compounds may also be employed as the capsule coating. Organic materials such as certain polymeric materials, e.g., Teflon, may also be vacuum deposited upon the capsules. The thickness of the vacuum-deposited coating may be varied or controlled, suitable thicknesses generally being within the range of 0.1 to 1 micron. Thicker coatings, for example, between 1 and 10 microns may be deposited especially when maximum impermeability is desired. It should be pointed out that the capsule wall coating may comprise one or more materials. For instance, the coating may comprise a single metal or an alloy or it may comprise two or more distinct layers of different metals such as, for example, a first layer comprising copper and a second layer overcoated on said first layer comprising aluminum.

Figure 1:
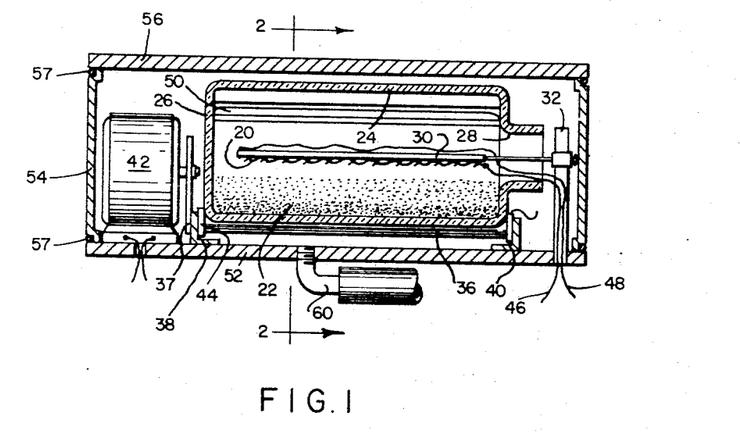
FIGURE 1 is a broken-away, side elevation of an apparatus for performing steps of a process for producing products of the present invention.
Figure 2:
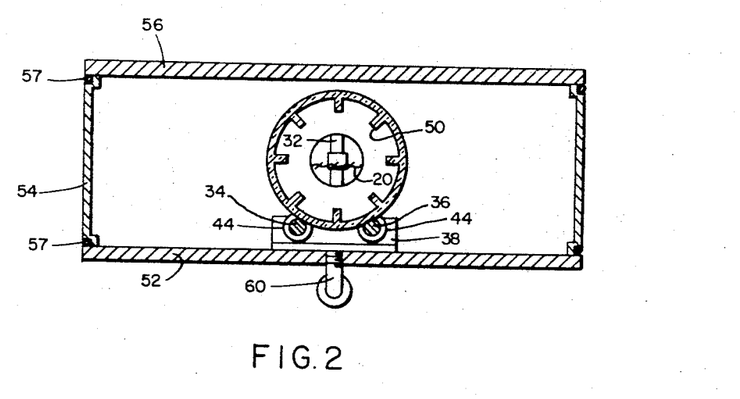
FIG. 2 is a cross-section of the apparatus of FIGURE 1, taken substantially above the line 2—2.

Figures 1 and 2 illustrate an apparatus for evaporating a material 20 onto capsules 22. Material 20, for example, is a metal in the form of a coating upon a wire gauze. Capsules 22 are contained within a cylindrical glass jar 24, one end of which is closed at 26 and the other end of which is provided with an open mouth 28. Gauze 20 is supported by a mounting arm 30 extending through mouth 28 and carried by a standard 32. Jar 24 rests upon a pair of rollers 34 and 36, the ends of which are journaled in bearing mounts 38 and 40. A motor 42 is provided for rotating rollers 34 and 36 through gearing 37 in order to cause rotation of jar 24, which is prevented from moving longitudinally by circular flanges 44 at the ends of the rollers. As shown, electrical leads 46 and 48 are connected to the opposite extremities of gauze 20 in order to transmit a suitable electric current through the gauze from a power supply (not shown). In operation, a sufficient current is transmitted by leads 46 and 48 through gauze 20 for generating sufficient heat to cause rapid evaporation of the coating of gauze 20. At the same time, motor 42 causes rotation of rollers 34 and 36 so that capsules 22 are continuously agitated by movement of the inner surfaces of jar 24 as well as a plurality of ribs 50 projecting inwardly from the inner surfaces of the jar. The apparatus, including jar 24, is mounted on a base plate 52 and enclosed by such means as a glass cylinder 54 and a cover plate 56. O-ring gaskets 57 hermetically seal glass cylinder 54 between base plate 52 and cover plate 56. A pump (not shown) continuously exhausts the region defined by base plate 52, glass cylinder 54 and cover plate 56 through a conduit 60. Capsules 22, as a result, become coated with a thin continuous coating of the metal which initially was part of gauze 20.

Instead of employing a metal coated wire gauze, there may be employed one or more metal-containing crucibles suitably heated such as by resistance or induction. The crucible may be composed of carbon or tantalum or some other material or materials well-known to the art.

Another method for producing a thin continuous metallic coating on capsule walls involves so-called "cathode sputtering." When an electrical discharge is passed between electrodes under low gas pressure, the cathode electrode is slowly disintegrated under bombardment by ionized gas molecules. The disintegrated material leaves the cathode surface and is condensed on capsules provided around the cathode. Likewise, other apparatus for carrying out the process wherein the capsules are moved past a source of vacuum evaporated metal while being held in a circumferential path by centrifugal force is illustrated, for example, in U.S. Patent 2,846,971. In addition to apparatus of the above-mentioned type, there may also be employed apparatus wherein the capsules are coated by allowing them to freely fall through vapors of the metal provided by one or more sources. One such apparatus is illustrated, for example, in U.S. Patent 2,374,331.

Another process for coating each capsule with a thin continuous metallic film or layer involves plating techniques such as electroplating. Since the capsule walls are non-metallic, the outer surface must be made conductive before plating. This may be achieved by vacuum depositing a very thin coating of a conductive metal, e.g., copper, upon the outer capsule wall as described above or a shellac or lacquer with a suspension of a conductive material such as a conductive metal powder, e.g., bronze powder, or graphite can be sprayed or dusted on the outer capsule walls. Capsules provided with a conductive surface may be plated with a continuous metallic coating of a suitable thickness, e.g., 0.1 to 1 micron, by any one of the many appropriate electroplating techniques well known to the art.

It should be mentioned that the thin continuous capsule coating of a metal or other material in addition to imparting increased impermeability to the capsule wall may also serve some other purpose or role such as, for example, for light reflectivity, for reaction with the nucleus material etc.

One particular applicability of the capsules of the present invention is in certain products or assemblages useful in photographic transfer reversal processes capable of producing a color print. In processes for forming color images by transfer techniques, an imagewise distribution of one or more color-providing substances is formed in unexposed parts of a negative photosensitive element having one or more light-sensitive portions having silver halide therein and transferred to an image-receiving element. The imagewise distribution of each color-providing substance so transferred and deposited upon the image-receiving element arranged in superposed relation to the negative photosensitive element colors the image-receiving element a predetermined color to provide therein a monochromatic or multichromatic image comprising one or more positive images of negative latent color images formed by the exposure of said photosensitive element. Among the techniques for carrying out a transfer process in color, mention may be made of, for example, (a) the processes disclosed and claimed in the copending application of Howard G. Rogers, Ser. No. 748,421, filed July 14, 1958, wherein dye developers (i.e., compounds which contain in the same molecule both the chromophoric system of a dye and also a silver halide developing function) are the color-providing substances or color-forming components; (b) the processes disclosed in U.S. Patent 2,774,668 and copending applications Ser. No. 565,135, filed Feb. 13, 1956, Ser. No. 748,421, previously cited, and Ser. No. 613,691, filed Oct. 3, 1956 wherein complete dyes of suitable colors and of a nature having a coupling group or function and which are able to couple with silver halide developers in oxidized condition are the color-providing substances; (c) the processes disclosed and claimed in U.S. Patents Nos. 2,647,049, 2,661,293, 2,698,244, 2,698,798 and 2,802,735 wherein color coupling techniques are utilized which comprise, at least in part, reacting one or more developing agents and one or more color formers to provide a positive color image in a superposed image-receiving layer; and (d) the processes disclosed in the copending application of Howard G. Rogers, Ser. No. 825,359, filed July 6, 1959, now Patent No. 3,185,567, wherein the color-providing substances employed are initially immobile or nondiffusible but which are rendered diffusible in unexposed areas of the photosensitive layer by reaction with unreacted or unexhausted silver halide developing agent. Such color-providing substances are hereinafter referred to as "reducible dyes."

The expression "color-providing substance" as used herein is intended to include all types of reagents which may be utilized to produce a color image, and such reagents may initially possess the desired color or may undergo a reaction to give the desired color. In a preferred embodiment, the color-providing substances are dye developers, that is, complete dyes which have a silver halide developing function as disclosed, for example, in the copending application of Howard G. Rogers, Ser. No. 748,421 and now Patent No. 2,983,606. The use of color formers or couplers which react with the oxidation product of color developers to produce a dye, and therefore dye intermediates, is also contemplated within the term "color-providing substance." The use of complete dyes per se as color-forming substances is also within the scope of this invention. The nature of these and other color-providing substances will be referred to in more detail hereinafter.

It has been found that color-providing substances such as mentioned above utilized to provide color images may be encapsulated or contained within a shell-like coating of a film-forming polymeric material. The nucleus of such capsules may comprise a color-providing substance in substantially solid form which is, for example, solubilized by the processing composition or the nucleus may comprise a suitable liquid solvent or medium in which a color-providing substance is dissolved or suspended. In order to prevent loss of the nucleus liquid and/or to retard or prevent undesirable environmental materials from reacting with the nucleus materials, the outer surfaces of the capsule wall are coated with a thin continuous film such as, for example, of aluminum or silver. These capsules may be utilized in the photosensitive element, for example, in or behind the silver halide emulsion. Preferably, a coating or layer of the capsules containing a color-providing substance, e.g., a dye developer, is placed behind the silver halide emulsion, i.e., on the side of the emulsion adapted to be located most distant from the photographed subject when the emulsion is exposed and most distant from the image-receiving element when in superposed relationship therewith. Placing such capsule layer or stratum behind the emulsion has the advantage of providing increased contrast in the positive image.

When employing a layer or stratum of capsules which contain, for example, a dye developer, reducible dye or complete dye in the preferred manner, i.e., behind the silver halide emulsion, it has been found that the effective emulsion speed can be substantially increased by having the outer surfaces or portions of such capsules provided with a thin coating such as of a suitable metal adapted to reflect light of all visible wave lengths incident upon it. The increase in effective emulsion speed is apparently due to the fact that previously the colored dye would ordinarily absorb light whereas now the reflecting coating utilizes some of the otherwise wasted light to increase the absorption of light in the emulsion when it is exposed. Thus the emulsion is effectively more sensitive since the exposure depends on the absorption of light.

In its broadest aspect, the emulsion speed of a photosensitive element may be increased by employing a light-reflecting environment, either diffuse or specular reflecting, behind a silver halide emulsion, but in front of the color-providing substance. This broad concept is conveniently carried out by the employment of a photosensitive element which comprises a support carrying thereon a photosensitive layer or stratum comprising a liquid-permeable material, for example, gelatin or other water- and alkali-permeable carrier having silver halide therein, and a layer comprising a profusion of minute capsules behind the photosensitive layer, said capsules comprising a wall or shell-like coating of a film-forming polymeric material surrounding a nucleus containing a predetermined color-providing substance such as, for example, a dye developer, the outer surfaces of said capsules having a suitable light-reflecting coating. In the present invention there is thus employed capsules having the outer surfaces of the capsule wall coated with a thin, light-reflecting film or layer such as, for example, of silver or aluminum which not only increases the effective emulsion speed but also increases the impermeability of the capsule walls so as to prevent loss of encapsulated liquid material or to exclude environmental substances such as moisture, oxygen or the like from contact with the encapsulated materials. The minute capsules may be formed by processes such as previously mentioned. The thin continuous light-reflecting coating may be applied to the capsule walls by any one of several methods such as, for example, spraying, electroplating, vapor deposition and the like as heretofore described.

Figure 3:
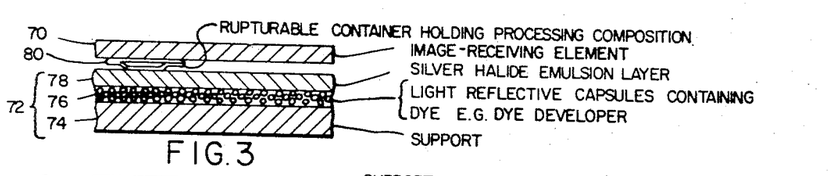
FIG. 3 is a diagrammatic enlarged side elevation of one embodiment of a film unit comprising a negative photosensitive element useful in carrying out the practices of this invention and, in association with said photosensitive element, an image-receiving element and a rupturable container, the three elements together providing a photographic product employable to carry out a photographic transfer process.

A further understanding of the inventive concepts herein may be gained by reference to the drawings. For purposes of simplicity the drawings will be described in connection with the use of dye developers, although other dyes such as reducible dyes, complete dyes and the like can also be employed in a like manner. One embodiment of a photographic film unit or assembly useful in carrying out a one-step photographic process for the formation of an image of an individual color is illustrated in FIG. 3. In FIG. 3 there is shown a film unit making use of a positive sheet material or image-receiving element 70 comprising an image-receiving layer of opaque or transparent material which is liquid-permeable and dyeable from alkaline solutions and which has been illustrated for the purposes of simplicity as a single sheet, for example, of paper. However, the positive element 70 may comprise a support upon which at least one liquid-permeable and dyeable layer is mounted.

The film unit also employs a negative sheet material or photosensitive element 72 comprising a support 74 of paper or film base material upon which there is mounted, in the order or sequence named, a layer 76 comprising a profusion of minute capsules in substantial contiguity, said capsules containing a dye such as a dye developer and having the outer surfaces thereof provided with a thin, light-reflecting coating and a conventional photosensitive layer 78 of silver halide. As previously noted, the use of a reflecting layer behind a silver halide emulsion layer but in front of a dye layer makes available otherwise wasted light for absorption by the emulsion while minimizing the absorption by the dye of light needed for exposure.

As shown in FIG. 3 the photosensitive element 72 and the image-receiving element 70, for the purpose of positive image formation in the corresponding image area of relation and are arranged so that the photosensitive layer or stratum 78 is next to the image-receiving element 70.

Also, in the film unit of FIG. 3 a rupturable container 80, adapted to carry an alkaline solution or liquid processing composition, is shown positioned transversely of and adhered to the image-receiving element 70. If desired, the container 80 may be adhered to the photosensitive element 72. Container 80 is of a length approximating the width of the film unit and is constructed to carry sufficient liquid to effect negative image formation in an exposed image area of the photosensitive layer 78 and positive imagee formation in the corresponding image area of image-receiving element 70. In use, the container 80 is adapted to be positioned between the image-receiving element and the photosensitive element so that it will be adjacent the edges of the corresponding image areas of these elements which are to be processed by the liquid contents of the container. When the film unit is of the roll film type, a plurality of containers are employed, one for each corresponding pair of successive image areas in the photosensitive and image-receiving elements. The nature and construction of rupturable containers such as that shown in FIG. 3 are well understood in the art; see, for example, U.S. Patents 2,543,181 and 2,634,886.

Support 74 of the photosensitive element 72 may be transparent or opaque and may comprise organic plastics, particularly those employed as film base materials, and may also comprise paper. Specific examples of the support materials comprise cellulose esters such as cellulose acetate, cellulose acetate butyrate and the like, certain nylon-type plastics and baryta paper.

The photosensitive silver halide layer used herein is provided by silver halide emulsions of the conventional character and is coated onto layer 76 after the latter has dried. Emulsions of suitable sensitivity range are chosen to meet the particular requirements of use to which the photosensitive element will be put. The silver halide is in all instances used in a water- and alkali-permeable carrier material such as gelatin, although other water- and alkali-permeable materials known to the art, may be substituted.

Figure 4:
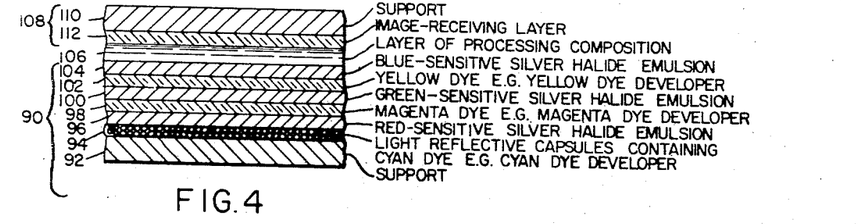
FIG. 4 is a diagrammatic enlarged sectional view illustrating the association of elements during one stage of the performance of a transfer process, the thickness of the various materials being exaggerated, and FIG. 4 further illustrates another embodiment of a photosensitive element useful in carrying out the practices of the invention for the formation of multicolor images.

As heretofore mentioned, the image-receiving material of the positive element 70 includes any material dyeable by the dyes employed, preferably from alkaline liquid. The positive element 70 may, as shown, comprise a single sheet of permeable material or it may comprise, as shown in FIG. 4, a support which carries a layer or a stratum of a permeable image-receiving material. An example of such is imbibition paper or baryta paper or conventional film base material upon which a permeable stratum is coated. As a further example, the image- or print-receiving element may comprise a paper support subcoated with a substantially water-impermeable material such as a cellulose ester, i.e., cellulose acetate and the like, and having a stratum of a permeable and dyeable material coated over the subcoat.

Image-receiving materials of a dyeable nature, in addition to those already named, include gelatin; nylon, such as N-methoxymethyl polyhexamethylene adipamide; partially hydrolyzed polyvinyl acetate, such as that commercially available under the trade name of Vinylite MA–28–18 from Bakelite Division, Carbide and Carbon Chemicals Co.; polyvinyl alcohol with or without plasticizers; mixtures of polyvinyl alcohol and N-polyvinylpyrrolidone, such as disclosed in the copending application, Ser. No. 700,281, filed Dec. 3, 1957, now Patent No. 3,003,872; regenerated cellulose, sodium alginate, cellulose esters, such as methyl cellulose, or other cellulose derivatives such as sodium carboxymethyl cellulose or hydroxyethyl cellulose; mixtures of such materials where they are compatible; and other materials of a similar nature such as are well known in the art. Where the image-receiving material named tends to be dissolved by alkali, it may be used by suitable cross-linking to preserve its film-forming ability. The image-receiving material may contain agents to mordant or otherwise fix the dye transferred thereto.

It will be apparent that, by appropriate selection of the image-receiving material from among the suitable known opaque and transparent materials, it is possible to obtain either a color positive reflection print or a colored positive transparency.

The liquid processing composition employed in carrying out the invention comprises at least an aqueous alkaline liquid of sufficient alkalinity to permit the developer to perform its developing function and in certain instances may also contain a conventional black and white developer dissolved therein. While sodium hydroxide is in general the preferred alkali used in the processing liquid, other alkaline material may be employed, for example potassium or lithium hydroxide, sodium or potassium carbonate, and diethylamine. If the liquid processing composition is to be applied in a relatively thin, uniform layer, it may also include a viscosity-increasing compound constituting film-forming material of the type which, when spread over a water-absorbent base, will form a relatively firm and stable film. A preferred film-forming material is a high molecular weight polymer such as a polymeric, water-soluble ether inert to an alkali solution, as, for example, a hydroxyethyl cellulose or sodium carboxymethyl cellulose. Other film-forming materials or thickening agents whose ability to increase viscosity is substantially unaffected when left in solution for a long period of time may also be used.

In practice, the negative material or photosensitive element is preferably exposed from the emulsion side. Following the exposure of the photosensitive element 72 to a desired subject, the processing of the unit for transfer image formation proceeds by rupturing the container and capsules and spreading the alkaline processing composition between the photosensitive element 72 and the image-receiving element 70. The processing liquid migrates or permeates into the separate alkali-permeable layers of the photosensitive element. During the permeation into the capsular layer 76, unreacted dye contained in this layer is dissolved in the processing liquid and is transported to the photosensitive layer 78. As the process proceeds, the latent silver halide image is developed, and as a result of the development, the dye in the exposed areas is immobilized. At least a portion of the mobile dye in the unexposed areas is imbibed to a superposed image-receiving element 70 to create thereon a positive dye image.

Figure 5:
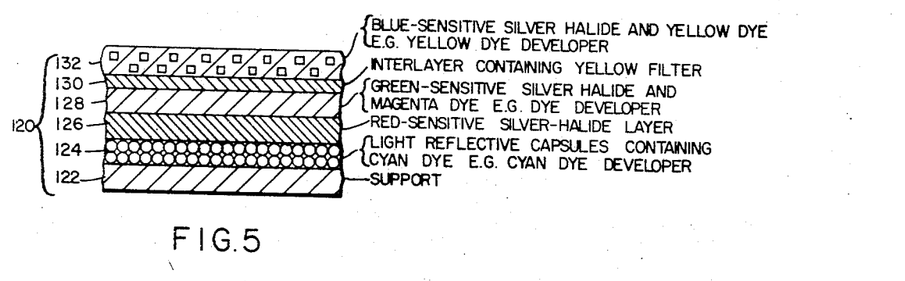
FIG. 5 is a diagrammatic enlarged sectional view of still another embodiment of a photosensitive element useful in carrying out the practices of this invention.

Integral multilayer photosensitive elements or assemblages for use in multilayer diffusion transfer processes are also applicable to the concepts of the present invention. Two suitable assemblages are illustrated in FIGS. 4 and 5. Broadly, such multilayer assemblages comprise at least two selectively sensitized photosensitive strata superposed on a single support and are processed, simultaneously and without separation, with a single common image-receiving element. One suitable arrangement comprises a support carrying a red-sensitive silver halide emulsion stratum, a green-sensitive silver halide emulsion stratum and a blue-sensitive silver halide emulsion stratum, said emulsions having associated therewith respectively a cyan dye, a magenta dye and a yellow dye. After the foregoing strata are photoexposed, a layer of alkaline aqueous solution may be spread between the assemblage and image-receiving element. The various dyes, e.g., dye developers, react with exposed portions of the silver halide emulsions with which they are associated. Portions of the dye so reacted are immobilized and portions of the dye remaining unreacted migrate through the various layers of the assemblage and the layer of alkaline aqueous solution to the print- or image-receiving element where they form a multicolored print.

In one embodiment, as shown in FIG. 4, the dyes, that is, the yellow dye developer and magenta dye developer, are disposed in separate liquid-permeable layers behind the photosensitive silver halide stratum with which they are associated. The cyan dye developer is encapsulated within light-reflective capsules and a layer or coating of such capsules is disposed behind the red-sensitive silver halide emulsion. In this embodiment, the color-providing substances are thus located on the side of the emulsion which is most distant from the photographed subject when the emulsion is exposed and also most distant from the image-receiving element when in superposed relationship therewith.

FIG. 4 illustrates an assemblage comprising, in sequence, a support 92, a layer 94 comprising a profusion of minute capsules in substantial contiguity, said capsules containing a cyan dye developer and having the outer surfaces thereof provided with a thin, light-reflecting coating, a red-sensitive silver halide emulsion layer 96, a magenta dye developer layer 98, a green-sensitive silver halide emulsion layer 100, a yellow dye developer layer 102, and a blue-sensitive silver halide emulsion layer 104. A processing composition 106 in the form of an aqueous alkaline solution is spread in a thin layer between photosensitive element 90 and image-receiving element 108 illustrated as a support 110 having a dyeable layer 112 thereon.

FIG. 5 illustrates an assemblage 120 comprising, in sequence, a support 122, a layer 124 comprising a profusion of minute capsules in substantial contiguity, said capsules containing a cyan dye developer and having the outer surface thereof provided with a thin, light-reflecting coating, a red-sensitive silver halide emulsion 126, a green sensitive silver halide emulsion stratum 128 containing a magenta dye developer, a yellow filter stratum 130, and a blue-sensitive silver halide emulsion stratum 132 having dispersed therein a yellow dye developer.

Yellow filter layer 130 is provided for attenuating light of wave lengths that must be prevented from affecting layers 124 and 128. Thus, filter layer 130 filters actinic light in the blue region of the spectrum. Auramine or colloidal silver are examples of suitable blue absorbing filters. The silver may be incorporated in gelatin, while auramine may be incorporated in cellulose acetate hydrogen phthalate. Interlayers of spacer layers (not shown), which, for example, are composed of gelatin, may be employed, for instance, between layers 126 and 128 to confine the developing action of the dye developers to the respective emulsion layers with which they are originally associated. Such control or spacer layers may also be used in assemblages such as illustrated in FIG. 3. The components or elements shown in FIGS. 4 and 5 are of compositions similar to those described in connection with FIG. 3.

In practice, the photosensitive elements of FIGS. 4 and 5 are processed when an aqueous alkaline solution is supplied between the photosensitive element and the image-receiving element so as to permeate all the layers of the assemblage and solubilize the dye developer therein. As the process proceeds, the red-sensitive emulsion, green-sensitive emulsion and blue-sensitive emulsion are differentially developed by cyan dye developer, magenta dye developer and yellow dye developer respectively, which, in consequence, become immobilized, more specifically insolubilized. On the other hand, the unexhausted or unreacted cyan dye developer, magenta dye developer and yellow dye developer are free to migrate in the solution to the image-receiving element where they form a multicolor print.

Figure 6:
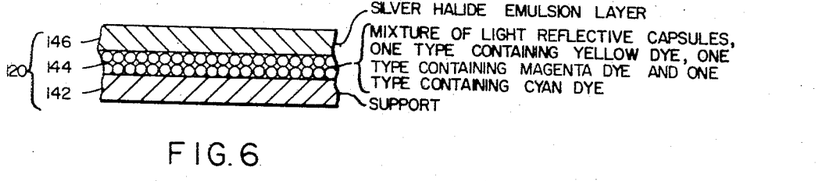
FIG. 6 is a diagrammatic enlarged sectional view of still another embodiment of a photosensitive element useful in carrying out the practices of this invention.

Another process for obtaining transfer images contemplates the use, behind the photosensitive layer, of a single layer comprising a profuse random dispersion of at least two sets of capsules having the outer surfaces thereof provided with a thin light-reflecting coating, said capsules containing therewithin suitable dye developers. One suitable photographic assemblage or element 140 of this type is illustrated in FIG. 6 and comprises, in sequence, a support 142, a layer 144 comprising in substantial contiguity a profusion of randomly dispersed capsules having the outer surfaces thereof provided with a thin, light-reflecting coating, one set or type of capsules containing a yellow dye developer, one type containing a magenta dye developer and one type containing a cyan dye developer, and a suitably sensitized silver halide emulsion layer 146. The processing of this photosensitive element is as previously described.

The color-providing substance is an organic compound and is a dye or a dye intermediate such as a color coupler which is preferably soluble in alkali solutions. In a preferred embodiment, the color-providing substance is a complete dye and preferably a dye developer, i.e., a complete dye which contains in the same molecule both the chromophoric system of a dye and also a silver halide developing function. By "a silver halide developing function" is meant a grouping adapted to develop exposed silver halide. A preferred silver halide developing function is a hydroquinonyl group. Other suitable developing functions include o-dihydroxyphenyl and o- and p-amino-substituted hydroxyphenyl groups. In general, the developing function includes a benzenoid developing function. Preferred dye systems are azo and anthraquinone dye systems.

The dye developers are preferably selected for their ability to provide colors that are useful in carrying out subtractive color photography, i.e., cyan, magenta and yellow. It should be noted that it is within the scope of this invention to use mixtures of dye developers to obtain a desired color, e.g., black. Thus, it is to be understood that the expression "color" as used herein is intended to include the use of a plurality of colors to obtain black, as well as the use of a single black dye developer.

As examples of suitable dye developers, mention may be made of 2-naphthylazohydroquinone, 1-phenyl-3-methyl-4-[p-(2',5' - dihydroxyphenethyl)-phenylazo]-5-pyrazolone and phenylazohydroquinone, for yellow; 2-hydroxynaphthylazohydroquinone, 2 - [p - (2',5'-dihydroxyphenethyl)-phenylazo]-4-methoxy-1-naphthol and 1-amino-4-phenylazo-2-naphthol, for magenta; 1,4 - bis - (2',5'-dihydroxyanilino)-anthraquinone, 1,4-bis-[β-(2',5'-dihydroxyphenyl)-ethylamino]-anthraquinone and 1,4-bis-[β-(2',5'-dihydroxyphenyl)-propylamino]-anthraquinone, for cyan.

Examples of representative dye developers are given in the previously mentioned application of Howard G. Rogers, Ser. No. 748,421.

It is also contemplated to use dye developers initially in the form of a hydrolyzable derivative particularly in the form of a hydrolyzable ester or salt and wherein said hydrolyzable derivative is subjected to hydrolysis conditions during processing. Such hydrolyzable dye developers are dye developers containing a grouping removable by hydrolysis, which group renders the dye developer substantially less mobile and/or less soluble until such grouping is removed by alkaline hydrolysis.

A more detailed discussion relating to hydrolyzable dye developers is set forth in the copending application of Land et al., Ser. No. 669,542, filed July 2, 1957 and now abandoned.

In addition to dye developers of the above-mentioned types, it is also contemplated to utilize dye developers with temporarily shifted absorption characteristics such as set forth in the copending application of Howard G. Rogers, Ser. No. 789,080, filed Jan. 26, 1959 and now abandoned.

The expression "temporarily shifted," as used above, is intended to signify color-providing substances, the spectral absorption bands of which are located at wave lengths which exhibit less absorption, with respect to the ultimate image dye, within the sensitivity range of associated photosensitive silver halide for at least the time interval necessary to accomplish photoexposure of the respective photosensitive silver halide. Such color-providing substances are subjected to non-reversible shift of the color-providing substances' absorption characteristics subsequent to photoexposure.

In addition to dye developers as described above, other color-providing substances may be employed to create colored positive images. As examples of other color-providing substances, mention may be made of the dyes of the type described in U.S. Patent 2,774,668 and the other patents and copending applications heretofore referred to. Dyes which are particularly suited for reacting with an oxidation product of a developer are found in those having an open position on a ring, which position is para to a hydroxyl or an amino group, or those dyes having a reactive methylene group. Many suitable dyes coming within the classification are found among the azo, pyrazolone and triphenyl methane dyes, specific examples of which comprise the following water- and alkali-soluble dyes such as Fast Crimson 6B1 (CI 57) for magenta; Fast Wool Yellow (CI 636) for yellow; Alphazurine 2G (CI 712) and Pontacyl Green SX Extra (CI 737) for cyan; and Polychrome Blue-Black (CI 201) and Rayon Black GSP (commercially available from E. I. du Pont) for black; as well as the water-insoluble but alkali-soluble dyes such as 1,5-dihydroxynaphthalene-4-azobenzene for magenta and Benzene Azo Resorcinol (CI 23) for yellow. When utilizing dyes of the above type, nondiffusing or substantially immobile silver halide developers are preferably employed so as to keep the developer out of the image-receiving element. Dyes which are rendered nondiffusible by the imagewise exhaustion of alkali, as disclosed in the copendnig application of Edwin H. Land, Ser. No. 640,821, filed Feb. 18, 1957, are also useful in practicing this invention. The inventive concepts herein set forth are also adaptable for the formation of colored images in conjunction with the photographic products and screen processes described and claimed in U.S. Patent 2,968,554, issued Jan. 17, 1961 to Edwin H. Land. In this patent, at least two selectively sensitized silver halide emulsions are arranged in the form of a screen and the encapsulated color-providing substances, as in multilayer elements, are placed behind the photosensitive emulsion with which they are associated.

It should be noted that it is within the scope of this invention to utilize in multicolor diffusion transfer processes, one or more of the above described color-providing substances in a single photosensitive element. For example, in certain instances it may be desirable to employ dye developers with temporarily shifted characteristics in association with blue-sensitive and green-sensitive capsules, together with another class of dye developers or color-providing substance.

In a preferred embodiment, an auxiliary or accelerating developing agent is used in combination with dye developer. Thus, the liquid processing composition may contain an auxiliary or accelerating developing agent. A preferred accelerating developing agent is a 3-pyrazolidone developing agent and preferably 1-phenyl-3-pyrazolidone which is available under the trade name "Phenidone" from Ilford Limited. It is also contemplated to employ a plurality of auxiliary or accelerating developing agents, such as a 3-pyrazolidone developing agent and a benzenoid developing agent, as disclosed and claimed in the copending application of Howard G. Rogers and Harriet W. Lutes, Ser. No. 654,781, filed Apr. 24, 1957, now Patent No. 3,039,869. As examples of suitable combinations of auxiliary developing agents, mention may be made of 1-phenyl-3-pyrazolidone in combination with p-benzylaminophenol and of 1-phenyl-3-pyrazolidone in combination with 2,5 - bis - ethylenimino hydroquinone. Such auxiliary developing agents may be employed in the liquid processing composition or they may be initially incorporated, at least in part, in the silver halide sensitized capsule containing the dye developers.

As stated above, it has heretofore been proposed to form color images by a diffusion-transfer process utilizing color-providing substances such as, for example, dye developers. In processes of this type, a photosensitive element containing a color-providing substance and a silver halide emulsion is exposed and wetted by a liquid processing composition, for example, by immersing, coating, spraying, flowing, etc., in the dark; and the exposed photosensitive element is superposed prior to, during or after wetting on a sheetlike support element which may be utilized as an image-receiving element. In a preferred embodiment, the liquid processing composition is applied to the photosensitive element in a substantially uniform layer as the photosensitive element is brought into superposed relationship with an image-receiving element. The liquid processing composition permeates the emulsion to initiate development of the latent image contained therein. The color-providing substance is immobilized or precipitated in exposed areas as a consequence of the development of the latent image. In unexposed and partially exposed areas of the emulsion, the color-providing substance is unreacted and diffusible and thus provides an imagewise distribution of diffusible, unreacted color-providing substance dissolved in the liquid processing composition as a function of the point-to-point degree of exposure of the silver halide emulsion. At least part of this imagewise distribution of unreacted color-forming substance is transferred, by imbibition, to a superposed image-receiving layer or element. Under certain conditions, the layer of the liquid processing composition may be utilized as the image-receiving layer. There is then produced on or in the image-receiving element a reversed or positive color image of the developed image. The image-receiving element may contain agents adapted to mordant or otherwise fix the positive color image. If the color of the transferred color-providing substance is affected by changes in the pH of the image-receiving element, this pH may be adjusted in accordance with well-known techniques to provide a pH affording the desired color. The desired positive image is revealed by stripping the image-receiving element from the photosensitive element at the end of a suitable imbibition period.

In prior diffusion-transfer processes, the photosensitive elements comprised at least one silver halide emulsion layer and at least one color-providing substance which could be present in the emulsion layer or in a layer on or behind the emulsion. The layers employed in such elements generally consist of a continuous gelled colloid film in which the silver halide and/or color-providing substance is dispersed, that is, the dispersed material constitutes discrete inclusions or a discontinuous phase within the continuous colloid phase.

In instances where the color-providing substances possess a color, undesirable light absorption by the color-providing substance may result in reducing the sensitivity of silver halide emulsions. Utilizing one or more color-providing substances in layers behind photosensitive silver halide emulsion layers adds to the bulk or thickness of the photosensitive element. This is particularly so when multicolor prints are to be obtained from a single photosensitive element.

It has been found that photosensitive elements with a minimum number of layers may be obtained, in addition to substantially reducing or eliminating the disadvantage of desensitization of the silver halide emulsion by colored color-providing substance associated therewith, by having said color-providing substance or substances encapsulated in a coating of an alkali-permeable film-forming polymeric material such as, for example, gelatin and having the outermost wall of the capsules coated with silver halide. Thus, there may be provided a photosensitive element including a support and at least one layer or coating thereon comprising in substantial contiguity a profuse number of minute capsules of alkali-permeable film-forming polymeric material containing therewithin a color-providing substance, the outermost walls of the capsules being coated with silver halide. The silver halide coating may be appropriately sensitized. A capsular layer may comprise in substantial contiguity single or individual capsules which all contain the same color-providing substance, or it may comprise individual capsules some of which contain one color-providing substance and others of which contain other color-providing substances. For example, the capsular layer may comprise capsules holding only a magenta dye developer; or the layer may comprise a mixture of capsules some of which hold a magenta dye developer, others of which hold a cyan dye developer and still others of which hold a yellow dye developer.

A capsular layer may also comprise a mixture of individual capsules some of which contain color-providing substance and others of which contain a reagent or reactive material useful in the formation of the desired images and which reagent or reactive material is preferably maintained or separated from contact with the color-providing substance until needed.

The color-providing substance per se, may be contained within the capsules and solubilized by an alkaline processing composition, or it may be dissolved or suspended in a suitable liquid medium or vehicle within the capsule. The liquid medium or vehicle employed within the capsule should not adversely affect the encapsulating material, nor should it interfere in the formation of the colored print. When the encapsulating material is of a hydrophilic nature, the medium within the capsule, if employed, is preferably of water-immiscible liquid. Suitable water-immiscible liquid mediums which may be employed are vegetable oils such as cottonseed oil, coconut oil, and castor oil; animal oils such as sperm oil and lard oil; petroleum fractions such as paraffin oil; synthetic oils such as methyl salicylate and the like. When the encapsulating material is of a hydrophobic nature, the medium, if employed, carrying the color-providing substance may comprise water or an organic material. When an aqueous medium is utilized, there may also be employed therewith a suitable water-miscible organic liquid which is desirable to have incorporated within the capsules.

In order to render the capsular material produced by the heretofore described techniques photosensitive, the outermost wall of the encapsulating material is impregnated or coated with appropriately sensitized silver halide. This may be accomplished in many ways. For example, the silver halide may be suspended in a suitable volatile vehicle and the capsules treated therewith. Upon evaporation or removal of the vehicle, the silver halide will be imbedded in and around the outermost capsule wall. The silver halide coating may then be suitably sensitized. It is also possible to disperse silver halide in a suitable solution of a binder and coat the outermost capsule walls therewith, the binder such as, for example, gelatin, in this case being used to aid the silver halide in adhering to the capsule walls. Additionally, it is possible to chemically plate silver onto or into the outermost capsule walls and then subject the silver coated capsules to the desired halogen vapors so as to form a silver halide coating, which is thereafter suitably sensitized. Alternatively the capsules may be coated with silver by well-known vapor deposition techniques such as, for example, vacuum deposition, and thereafter subjected or treated with the desired halogen vapors to form a silver halide coating around the outermost capsule walls. The appropriate sensitization of the silver halide coating with a photosensitizing agent such as a silver halide optical sensitizing agent or a hypersensitizing agent may be accomplished by vacuum deposition techniques or other known methods.

The photosensitized capsules may be coated on a suitable support, e.g., paper, or layer, e.g., previously coated capsular layer, by techniques which are well known in the art, e.g., by rollers, spray, brushes or any of the commonly used methods, and then allowed to dry. The capsules when dry are adherent to the support or layer overcoated therewith and to each other in a film.

As mentioned previously, the capsular layer of a photosensitive element may comprise a mixture of individual capsules some of which are photosensitized with silver halide and which contain a color-providing substance and others of which are not photosensitized and which contain a reagent or reactive material useful in the formation of the desired images and which reagent or reactive material is preferably maintained or separated from contact with the color providing substance. Capsules of the latter type, i.e., non-photosensitive, may comprise, for example, gelatin capsules containing an auxiliary or accelerating developing agent such as 1-phenyl-3-pyrazolidone. These non-photosensitized capsules may be produced by the methods described above except that the silver halide coating is omitted although such capsules may have a thin continuous coating such as of aluminum to render the capsules more impermeable.

Several embodiments wherein the silver halide coated capsules may be utilized are illustrated in the accompanying drawings. References to dye developers in the description of these embodiments is intended to be illustrative only. While the preferred color-providing substances are dye developers and the several embodiments are illustrated by the use of dye developers, it is to be understood that other types of color-providing substances may be employed.

Figure 7:
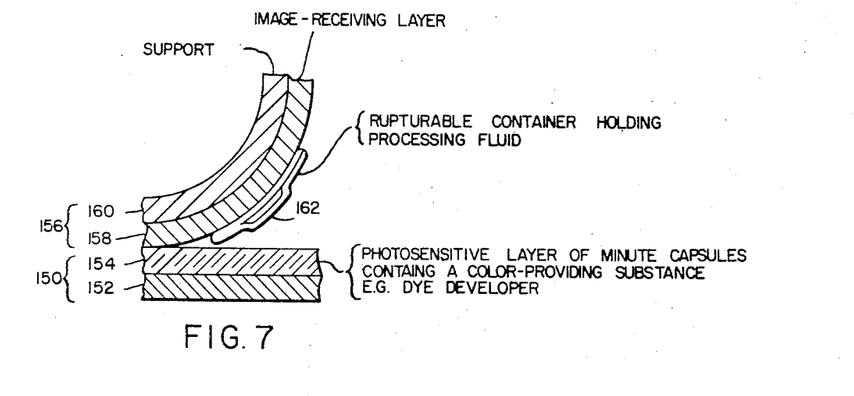
FIG. 7 is a diagrammatic cross-sectional view of a photographic film unit for use in obtaining monochromatic images, and comprising a photosensitive element, an image-receiving element and a rupturable container holding a liquid processing fluid.

One embodiment of a photographic film unit or assembly useful in carrying out a one-step photographic process for the formation of an image of an individual color is illustrated in FIG. 7 as comprising a photosensitive element 150, a print-receiving element 156 and a rupturable container 162 for holding a liquid processing fluid or composition.

The photosensitive element 150 comprises a conventional paper or plastic film base or support 152 and a photosensitive layer 154 comprising, in substantial contiguity, a profusion of minute capsules of alkali-permeable film-forming polymeric material coated with silver halide appropriately sensitized, said capsules containing a color-providing substance such as a dye developer. As shown in the particular embodiment depicted in FIG. 7, the photosensitive element 150 is shown in a spread-apart relationship with an image-receiving element 156 having mounted thereon a rupturable container 162 holding a processing composition. The image-receiving element 156 comprises a dyeable material and may comprise a single image-receiving layer or, as shown, an image-receiving layer 158 carried by a support 160. After exposure, the image-receiving element 156 is brought into superposed relationship with the photosensitive element 150, and the rupturable container 162 is ruptured by application of suitable pressure, e.g., by advancing between a pair of rollers (not shown); and a layer of the liquid processing composition is spread between the superposed elements. The processing composition permeates into the capsular photosensitized layer 154 to initiate development of the latent image in the exposed silver halide regions. In exposed silver halide areas, the dye developer, for example, carried by the capsules, will be reacted and become immobilized. In unexposed areas, the dye developer will be mobile and will diffuse to the superposed image-receiving element 156. After a suitable imbibition period, the photosensitive element 150 and the image-receiving element 156 are separated to reveal the positive colored image.

Multicolor images may be obtained using dye developers in diffusion-transfer reversal processes by several techniques. One such process for obtaining multicolor transfer images utilizing dye developers employs an integral multilayer photosensitive element wherein at least two selectively sensitized photosensitive layers are superposed on a single support and are processed simultaneously and without separation, with a single common image-receiving layer. A suitable arrangement of this type comprises a support carrying a red-sensitive silver halide layer, a green-sensitive silver halide layer and a blue-sensitive silver halide layer, said layers having associated therewith, respectively, a cyan dye developer, a magenta dye developer and a yellow dye developer. Each dye developer is encapsulated within minute capsules of alkali-permeable polymeric materials, the outermost walls of said capsules being suitably sensitized with silver halide.

Figure 8:
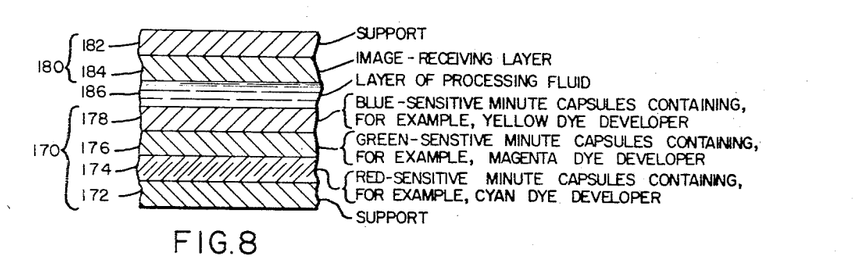
FIG. 8 is a diagrammatic cross-sectional view of one embodiment of this invention for use in obtaining multicolor images, during processing, and comprising an integral multilayer photosensitive element, an image-receiving element and a processing fluid.

A multilayer photosensitive element of the type just described is illustrated in FIG. 8 of the accompanying drawings and is depicted during processing. An exposed multilayer photosensitive element 170 comprises a support 172; a photosensitive layer 174 comprising in substantial contiguity, a profusion of red-sensitized silver halide minute capsules of alkali-permeable polymeric material, said capsules containing a cyan dye developer; a photosensitive layer 176 comprising in substantial contiguity, a profusion of green-sensitized silver halide minute capsules of alkali-permeable polymeric material, said capsules containing a magenta dye developer; and a photosensitive layer 178 comprising in substantial contiguity, a profusion of blue-sensitized silver halide minute capsules of alkali-permeable polymeric material, said capsules containing a yellow dye developer. Each photosensitive layer may be separated from each other by suitable interlayers (not shown), for example, by a layer of gelatin and/or polyvinyl alcohol. In certain instances it may be desirable to incorporate a yellow filter in front of the green-sensitive layer, and such yellow filter may be incorporated in an interlayer. A yellow filter layer may be prepared using a pigment comprising a suspension of a benzidine yellow, such as that commercially available under the name of "Padding Yellow GL" from Textile Colors Division, Interchemical Corporation, Hawthrone, N.J. However, where desirable, a yellow dye developer of the appropriate spectral characteristics and present in a state capable of functioning as a yellow filter may be employed. In such instances a separate yellow filter may be omitted.

Referring again to FIG. 8, a multilayer photosensitive element 170 is shown in processing relationship with an image-receiving element 180 and a layer 186 of a processing composition. The image-receiving element 180 comprises a support 182 and an image-receiving layer 184.

As noted in connection with FIG. 7, the liquid processing composition is effective to initiate development of the latent image in the respective exposed photosensitive layers. After a suitable imbibition period, during which at least a portion of the dye developer associated with unexposed areas of each of the photosensitive layers is transferred to the superposed image-receiving element 180, the latter element may be separated to reveal the positive multicolor image.

Although the structure of the integral, multilayer photosensitive element has been illustrated as having photosensitive layers from top to bottom sensitized to blue, green and red portions of the spectrum, respectively, it is to be understood that the order of these layers may vary in accordance with well-known practices in the art.

The expression "integral multilayer photosensitive element" as used herein is intended to include photosensitive elements comprising at least two separate, superposed layers of photosensitive material, each layer being selectively sensitized to an appropriate portion of the spectrum, at least the inner layer or layers having associated therewith appropriate color-providing substances. The integral multilayer photosensitive element is intended to be processed without separation of the layers. The imagewise distribution of diffusible color-forming substances present in each layer as a result of the development of latent images therein is transferred to a single, common image-receiving element to provide the desired multicolor image.

As will be demonstrated hereinafter, the term "layer" is intended to include a stratum comprising a mixture of at least two differently photosensitized capsular materials. Thus, such a stratum may comprise a mixture of two or more sets or types of minute capsules of alkali-permeable polymeric material, each set being suitably sensitized with silver halide and encasing or containing therewithin an appropriate color-providing substance. The term "layer" also contemplates a stratum comprising at least two sets of selectively sensitized minute photosensitized capsular materials arranged in the form of a photosensitive screen.

Another process for obtaining multicolor transfer images utilizing dye developers contemplates the use of a single photosensitive layer comprising a profuse random dispersion of at least two sets of selectively sensitized minute capsules of alkali-permeable polymeric material, said capsules containing therewithin a suitable dye developer. One suitable arrangement of this type comprises a support carrying as a single layer red-sensitized minute capsules containing a cyan dye developer, green-sensitized minute capsules containing a magenta dye developer and blue-sensitized minute capsules containing a yellow dye developer, said capsules being profusely and randomly dispersed.

Figure 9:
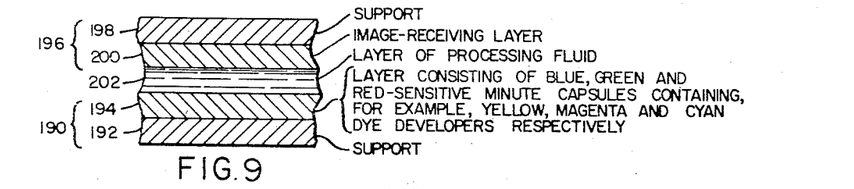
FIG. 9 is a diagrammatic cross-sectional view of another embodiment of this invention for use in obtaining multicolor images, during processing, and comprising a photosensitive element, an image-receiving element and a processing fluid.

A photosensitive element of the type just described is illustrated in FIG. 9 of the accompanying drawings and is depicted during processing. An exposed photosensitive element 190 comprises a support 192 and a photosensitive layer 194 comprising in substantial contiguity a profusion of randomly dispersed red-sensitized silver halide minute capsules of alkali-permeable polymeric material containing a cyan dye developer, green-sensitized silver halide minute capsules of alkali-permeable polymeric material containing a magneta dye developer and blue-sensitized silver halide minute capsules of alkali-permeable polymeric material containing a yellow dye developer. As illustrated, photosensitive element 190 is in processing relationship with an image-receiving element 196 and a layer 202 of a processing composition. The image-receiving element 196 comprises a support 198 and an image-receiving layer 200. The processing of exposed photosensitive element 190 is as previously described.

Another technique for obtaining multicolor transfer images utilizing dye developers contemplates the use of a photosensitive layer comprising at least two sets of selectively sensitized minute capsules arranged in the form of a photosensitive screen. In such an embodiment each of the minute capsules has contained therewithin a suitable dye developer. In general, a suitable photosensitive screen comprises red-sensitized minute capsules containing a cyan dye developer, green-sensitized minute capsules containing a magneta dye developer, and blue-sensitized minute capsules containing a yellow dye developer arranged in side-by-side relationship in a screen pattern.

Figure 10:
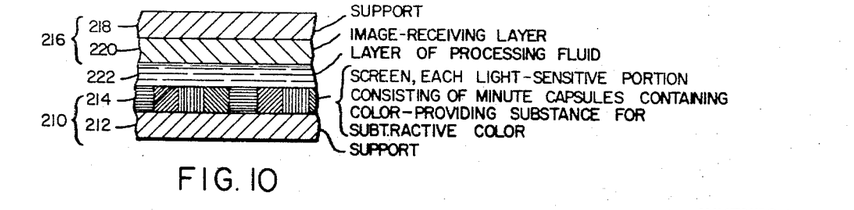
FIG. 10 is a diagrammatic cross-sectional view of still another embodiment of this invention for use in obtaining multicolor images, during processing, and comprising a photosensitive color screen element, an image-receiving element and a processing fluid.

A photosensitive color screen element of the type just described is illustrated in FIG. 10 of the accompanying drawings wherein the photosensitive element 210 comprises, respectively, a support 212 and a photosensitive color screen layer 214 which comprises selectively exposable portions, that is, portions which comprise, respectively, red-, green- and blue-sensitized silver halide minute capsules containing therewith, respectively, cyan, magenta and yellow dye developers, preferably substantially uniformly distributed over the support such that a contiguous layer arrangement of individual selectively exposable portions have their respective exposure faces arranged in a side-by-side screen pattern relationship and forming the exposure surface of photosensitive element 210. As shown, photosensitive element 210 is in processing relationship with a image-receiving element 216 and a processing composition 222. The image-receiving element 216 comprises a support 218 and an image-receiving layer 220. The processing of exposed photosensitive element 210 is as previously described.

Moreover, the techniques of this invention may be utilized in two-color processes as well as the three-color photographic processes illustrated in FIGS. 8, 9 and 10. Thus, for example, although photosensitive elements for three-color processes have been shown, photosensitive elements for use in two-color processes may be constructed and processed in a similar manner. For example, an integral multilayer photographic element suitable for two-color processes may have one layer of minute capsules sensitized to the blue and green portions of the spectrum, said capsules containing an orange dye developer and another layer of minute capsules sensitized to the orange and red portions of the spectrum, said capsules containing a cyan dye developer. Obviously, the sensitivities of the layers or sets of minute capsules may be selected in accordance with well-known photographic principle.

While the above assemblages have been described in connection with color processes involving the application of but one processing solution, it should be understood that they may also be employed in processes involving the application of several processing compositions, as, for example, the multiple step processes set forth in the copending U.S. applications of Edwin H. Land, Ser. No. 663,732, filed June 5, 1957 and now abandoned, and of Edwin H. Land et al., Ser. No. 665,807, filed June 14, 1957 and now abandoned.

Throughout the specification and appended claims, the expression "positive image" has been used. The expression should not be interpreted in a restrictive sense since it is used primarily for purposes of illustration, in that it defines the image produced on the image-carrying layer as being reversed, in the positive-negative sense, with respect to the image in the photosensitive element. As an example of an alternative meaning for "positive image," assume that the photosensitive element is exposed to actinic light through a negative transparency. In this case, the latent image in the photosensitive element will be a positive and the image produced on the image-carrying layer will be a negative. The expression "positive image" is intended to cover such an image produced on the image-carrying layer.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photosensitive element useful for the formation of color images which comprises, in combination, a support, at least one photosensitive silver halide layer, and at least one color-providing substance associated with said photosensitive silver halide layer, said color-providing substance being enclosed within discrete microscopic capsules comprising a substantially continuous film-forming polymeric inner layer and a substantially continuous outer layer comprising an elemental metal or an oxide thereof.

2. A photosensitive element as defined in claim 1 wherein said color-providing substance is a dye developer.

3. A photosensitive element as defined in claim 1 wherein said polymeric inner layer comprises an alkaline solution permeable polymer.

4. A photosensitive element as defined in claim 1 wherein said elemental metal outer layer is light reflecting.

5. A photosensitive element as defined in claim 1 wherein said elemental metal comprises aluminum.

6. A photosensitive element as defined in claim 1 wherein said capsules are dispersed as a separate layer intermediate said silver halide emulsion layer and said support.

7. A process for forming color transfer images which comprises the steps of exposing a photosensitive element comprising a support, at least one photosensitive silver halide layer, and at least one color-providing substance associated with said photosensitive silver halide, said color-providing substance being enclosed within discrete microscopic capsules comprising a substantially continuous film-forming polymeric inner layer and a substantially continuous outer layer comprising an elemental metal or an oxide thereof, developing the latent image present in said exposed silver halide, rendering nondiffusible, as a function of said development, said color-providing substance associated with said exposed silver halide whereby an imagewise distribution of diffusible color-providing substance is provided, and transferring, by imbition, at least a portion of said imagewise distribution of diffusible color-providing substance to a superposed image-receiving layer to provide a color transfer image thereto.

8. A process as defined in claim 7 wherein said color-providing substance is a dye developer.

9. A process as defined in claim 7 wherein said polymeric inner layer comprises an alkaline solution permeable polymer.

10. A process as defined in claim 7 wherein said elemental metal outer layer is light reflecting.

11. A process as defined in claim 7 wherein said elemental metal comprises aluminum.

References Cited

UNITED STATES PATENTS 2,517,513   8/1950   Vaernet.
3,016,308   1/1962   Macaulay __________ 117—36.7
3,143,508   8/1964   Kaprelian _________ 117—1000

FOREIGN PATENTS 221,880   5/1959   Australia.

NORMAN G. TORCHIN, *Primary Examiner.*

J. P. BRAMMER, *Assistant Examiner.*

U.S. Cl. X.R.

96—76